US010482903B2

(12) United States Patent
Tao et al.

(10) Patent No.: US 10,482,903 B2
(45) Date of Patent: Nov. 19, 2019

(54) METHOD, DEVICE AND APPARATUS FOR SELECTIVELY INTERACTING WITH MULTI-DEVICES, AND COMPUTER-READABLE MEDIUM

(71) Applicant: Baidu Online Network Technology (Beijing) Co., Ltd., Beijing (CN)

(72) Inventors: Sha Tao, Beijing (CN); Yonghui Zuo, Beijing (CN); Peng Wang, Beijing (CN); Guoguo Chen, Beijing (CN); Ji Zhou, Beijing (CN); Kaihua Zhu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 101 days.

(21) Appl. No.: 15/854,430

(22) Filed: Dec. 26, 2017

(65) Prior Publication Data

US 2019/0147904 A1 May 16, 2019

(30) Foreign Application Priority Data

Nov. 16, 2017 (CN) .......................... 2017 1 1137650

(51) Int. Cl.
*G10L 15/00* (2013.01)
*G10L 25/78* (2013.01)
(Continued)

(52) U.S. Cl.
CPC ............ *G10L 25/78* (2013.01); *G06F 1/3206* (2013.01); *G10L 15/08* (2013.01); *G10L 15/22* (2013.01);
(Continued)

(58) Field of Classification Search
CPC ......... G10L 15/00; G10L 15/07; G10L 15/08; G10L 15/183; G10L 15/20; G10L 15/22;
(Continued)

(56) References Cited

U.S. PATENT DOCUMENTS 9,818,407 B1 11/2017 Secker-Walker et al.
2018/0061419 A1* 3/2018 Melendo Casado .... G10L 15/22
(Continued)

FOREIGN PATENT DOCUMENTS

CN 105554283 A 12/2015
CN 204856459 U 12/2015
(Continued)

OTHER PUBLICATIONS

Chinese Office Action and Search Report issued in Chinese Application No. 201711137650.0 dated Aug. 30, 2018.
(Continued)

*Primary Examiner* — Qi Han
(74) *Attorney, Agent, or Firm* — Arent Fox, LLP

(57) ABSTRACT

A method for selectively interacting with multi-devices is provided. The method includes the following steps: receiving identical voice information transmitted by a plurality of terminal devices respectively; performing voice recognition on the received voice information; calculating energy of a wake-up word in respective voice information; and comparing the energy of one wake-up word with another, and transmitting feedback information to the terminal devices according to an energy comparison result and a voice recognition result. By calculating the energy of the wake-up word in respective voice information transmitted by respective devices, the distances between respective device and a user can be distinguished. A unique response can be ensured by determining that the device closest to the user responds to the user's request, thus ensuring the user experience.

11 Claims, 6 Drawing Sheets

(51) Int. Cl.
*G10L 15/22* (2006.01)
*G10L 15/08* (2006.01)
*G06F 1/3206* (2019.01)

(52) U.S. Cl.
CPC .. *G10L 2015/088* (2013.01); *G10L 2015/223* (2013.01)

(58) Field of Classification Search
CPC . G10L 15/26; G10L 2015/00; G10L 2015/06; G10L 2015/08; G10L 2015/088; G10L 2015/223; G10L 2015/225; G10L 2015/228
USPC ............. 704/231, 246, 251, 270.1, 270, 275
See application file for complete search history.

(56) References Cited

U.S. PATENT DOCUMENTS

| | | | |
|---|---|---|---|
| 2018/0286406 A1 | 10/2018 | Casado et al. | |
| 2019/0027138 A1* | 1/2019 | Wang | G10L 15/22 |

FOREIGN PATENT DOCUMENTS

| | | |
|---|---|---|
| CN | 105957519 A | 9/2016 |
| CN | 106328132 A | 1/2017 |
| CN | 107077844 A | 8/2017 |
| CN | 107103906 A | 8/2017 |
| JP | H11052976 A | 2/1999 |
| JP | 2005057402 A | 3/2005 |
| JP | 2006174216 A | 6/2006 |
| JP | 2010156825 A | 7/2010 |
| JP | 2017072857 A | 4/2017 |
| JP | 2017126317 A | 7/2017 |
| JP | 2017537361 A | 12/2017 |

OTHER PUBLICATIONS

China Search Report corresponding to Chinese Application No. 2017111376500, dated Nov. 16, 2018.
China Second Office Action corresponding to Chinese Application No. 2017111376500, dated Nov. 27, 2018.
Japan Notice of Reasons for Refusal corresponding to Japanese Application No. 2018-141110, dated Jul. 10, 2019.

* cited by examiner

METHOD, DEVICE AND APPARATUS FOR SELECTIVELY INTERACTING WITH MULTI-DEVICES, AND COMPUTER-READABLE MEDIUM

CROSS-REFERENCE TO RELATED APPLICATIONS

The present application claims the benefit of priority to Chinese Patent Application No. 201711137650.0, filed before the State Intellectual Property Office on Nov. 16, 2017, and entitled "Method, Device and Apparatus for Selectively Interacting with Multi-Devices, and Computer-Readable Medium", which is incorporated in the present application by reference in its entirety.

TECHNICAL FIELD

The present application relates to the technical field of voice recognition, and in particular, to a method, device and apparatus for selectively interacting with multi-devices, and a computer-readable medium.

BACKGROUND

With the development of intelligent voice interaction devices, there are more than one intelligent voice device in more and more occasions. For example, in the use scenarios of smart home, there are televisions, refrigerators, speaker boxes and other devices. Each device needs a wake-up word to wake it up, and if the wake-up words for the devices are identical, for example, when a user is waking up a device using a wake-up word of "Xiaodu, Xiaodu", these waked-up devices may simultaneously respond to the user's request and interact with the user at the same time. Then, the user will be confused about to which device makes voice interaction with him or her.

SUMMARY

Embodiments of the present application provide a method, device and apparatus for selectively interacting with multi-devices, and a computer-readable medium to at least solve the above technical problems in the existing technology.

According to the first aspect, an embodiment of the present application provides a method for selectively interacting with multi-devices, including the following steps:

receiving voice information from a plurality of terminal devices, wherein the voice information from the plurality of terminal devices comprises an identical wake-up word;

performing voice recognition on the received voice information;

calculating an energy value of the wake-up word in the voice information from the plurality of terminal devices; and comparing the energy values of the wake-up word, and transmitting feedback information to the terminal devices according to an energy comparison result and a voice recognition result.

In conjunction with the first aspect, in the first implementation mode of the first aspect of the present application, the receiving voice information from a plurality of terminal devices further comprises: extracting the wake-up word carried in the voice information.

In conjunction with the first aspect, in the second implementation mode of the first aspect of the present application, the calculating an energy value of the wake-up word in the voice information comprises: calculating the energy value according to a sound volume of the wake-up word.

In conjunction with the first aspect, in the third implementation mode of the first aspect of the present application, the transmitting feedback information to the terminal devices according to an energy comparison result and a voice recognition result comprises: transmitting response information of the voice information to the terminal device with the highest energy value.

In conjunction with the first aspect, in the fourth implementation mode of the first aspect of the present application, before the receiving voice information from a plurality of terminal devices, further comprising: calibrating recording performances of the plurality of terminal devices, wherein the calibrating comprises:

transmitting a play request for a standard speech to the plurality of terminal devices, wherein the standard speech is played and recorded by the plurality of terminal devices; and receiving recordings uploaded by the plurality of terminal devices, acquiring the recording performances of the respective terminal devices based on the received recordings, and setting recording performance coefficients for the respective terminal devices.

In conjunction with the first aspect, in the fifth implementation mode of the first aspect of the present application, before the receiving voice information from a plurality of terminal devices, further comprising: adding or deleting a terminal device.

According to the second aspect, an embodiment of the present application provides a device for selectively interacting with multi-devices, including:

a receiving module configured to receive voice information from a plurality of terminal devices, wherein the voice information from the plurality of terminal devices comprises an identical wake-up word;

a recognizing module configured to perform voice recognition on the received voice information;

a calculating module configured to calculate an energy value of the wake-up word in the voice information from the plurality of terminal devices; and a feeding back module configured to compare the energy values of the wake-up word, and transmit feedback information to the terminal devices according to an energy comparison result and a voice recognition result.

In conjunction with the second aspect, in the first implementation mode of the second aspect of the present application, the receiving module is further configured to extract the wake-up word carried in the voice information.

In conjunction with the second aspect, in the second implementation mode of the second aspect of the present application, the calculating module is configured to calculate the energy value according to a sound volume of the wake-up word.

In conjunction with the second aspect, in the third implementation mode of the second aspect of the present application, the feeding back module is further configured to compare the energy values of the wake-up word, transmit response information of the voice information to the terminal device with the highest energy value.

In conjunction with the second aspect, in the fourth implementation mode of the second aspect of the present application, the device for selectively interacting with multi-devices further includes a calibrating module configured to calibrate recording performances of the plurality of terminal devices, wherein the calibrating module includes:

a voice transmitting sub-module configured to transmit a play request for a standard speech to the plurality of terminal devices, wherein the standard speech is played and recorded by the plurality of terminal devices; and a recording calibrating sub-module configured to receive recordings uploaded by the plurality of terminal devices, acquire the recording performances of the respective terminal devices, and set recording performance coefficients for the respective terminal devices.

In conjunction with the second aspect, in the fifth implementation mode of the second aspect of the present application, the device for selectively interacting with multi-devices further includes a setting module configured to add or delete a terminal device.

The functions of the device may be implemented by hardware or by executing corresponding software with hardware. The hardware or software includes one or more modules corresponding to the functions described above.

In a possible design, the device for selectively interacting with multi-devices structurally includes a processor and a memory, wherein the memory is configured to store programs which support the device for selectively interacting with multi-devices to execute the method for selectively interacting with multi-devices in the first aspect. The processor is configured to execute the programs stored in the memory. The device for selectively interacting with multi-devices may further include a communication interface through which the device for selectively interacting with multi-devices is communicated with other device or communication network.

According to the third aspect, an embodiment of the present application provides a computer-readable medium configured to store computer software instructions used by the device for selectively interacting with multi-devices. The computer-readable medium includes programs involved for executing the method for selectively interacting with multi-devices in the first aspect.

One of the above-described technical solutions has the following advantages or beneficial effects: by calculating the energy values of the wake-up word in the voice information, the distances between respective devices and a user can be distinguished. A unique response can be ensured by determining that the device closest to the user responds to the user's request, thus ensuring the user experience.

The above summary is for the purpose of the description only and is not intended to be limited in any way. In addition to the schematic aspects, implementations and features described above, further aspects, implementations and features of the present application will be readily understood with reference to the drawings and the following detailed description.

BRIEF DESCRIPTION OF THE DRAWINGS

In the drawings, unless otherwise specified, an identical reference numeral throughout a plurality of drawings represents an identical or similar component or element. The drawings are not necessarily drawn to scale. It should be understood that these drawings only represent some implementations disclosed in accordance with the present application and should not be considered as limiting the scope of the present application.

DETAILED DESCRIPTION OF THE EMBODIMENTS

In the following, only certain exemplary embodiments are briefly described. As can be realized by those skilled in the art, the described embodiments may be modified in various ways, without departing from the spirit or scope of the present application. Accordingly, the drawings and description are considered to be illustrative in nature and not restrictive.

The embodiments of the present application aim to solve the technical problem in the existing technology that more than one terminal device may respond to the user's voice information at the same time in a case that there are a plurality of devices. The embodiments of the present application mainly lie in that: before voice information is responded by a cloud side, the energy values of the wake-up word in the voice information are calculated, the distances between respective devices and a user can be distinguished, and a unique response can be ensured by determining that the device closest to the user responds to the user's request, thus ensuring the user experience. The technical solutions will be described in detail respectively below according to the following embodiments.

Embodiment 1

Figure 1:
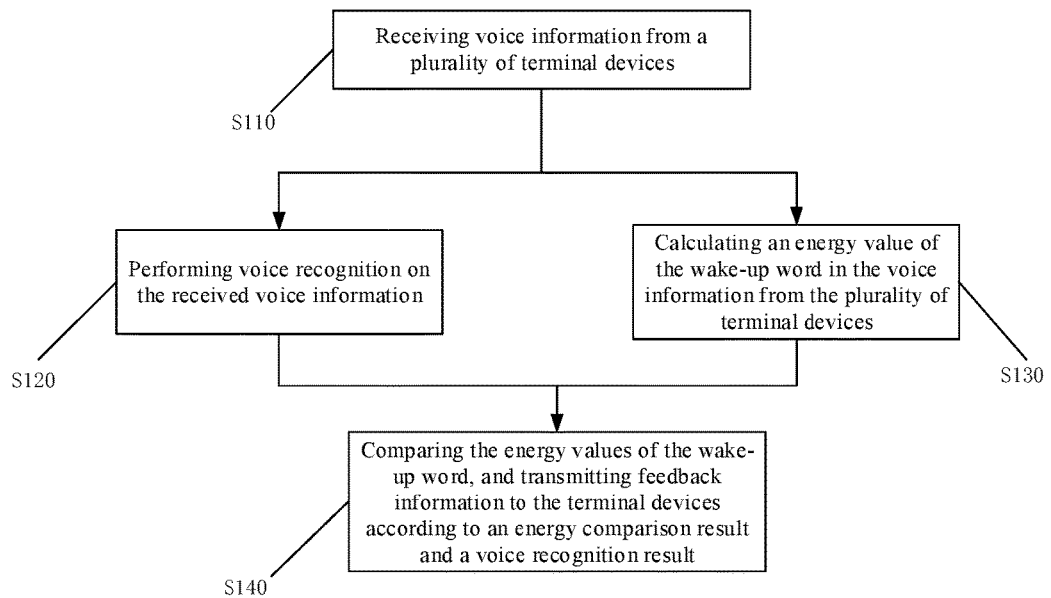
FIG. 1 is a schematic flowchart of a method for selectively interacting with multi-devices according to embodiment 1 of the present application.

FIG. 1 is a flowchart of a method for selectively interacting with multi-devices according to embodiment 1. Embodiment 1 of the present application provides a method for selectively interacting with multi-devices, which is applied to a cloud side and includes the following steps.

S110, receiving voice information from a plurality of terminal devices, wherein the voice information from the plurality of terminal devices comprises an identical wake-up word.

When a user gives out voice information, a plurality of device terminals will upload the received voice information to the cloud side if they receive the voice information at the same time. In an implementation of the present application, a device terminal will mark the wake-up word while uploading the voice information. For example, if the voice information given by the user is "Xiaodu, Xiaodu, turn on the device", and several devices receive the voice information at the same time, the wake-up word "Xiaodu, Xiaodu" will be marked firstly, and the received voice information is then uploaded to the cloud side. After the voice information is received at the cloud side, each wake-up word "Xiaodu, Xiaodu" will be extracted. Then, the following steps S120 and S130 are performed.

S120, performing voice recognition on the received voice information.

After the voice information is received, voice recognition can be performed through an ASR (Automatic Speech Recognition) system to identify the specific meaning of the voice information.

S130, calculating an energy value of the wake-up word in the voice information from the plurality of terminal devices.

Energy value of the received "wake-up word" is calculated. The energy value calculation specifically includes: calculating the energy value according to a sound volume of the received "wake-up word" of the voice information. The larger the sound volume, the higher the energy value. However, the distances between the user and respective devices can be determined according to the energy value of the sound because the sound volume decreases with the propagation distance of sound.

S140, comparing the energy values of the wake-up word, and transmitting feedback information to the terminal devices according to an energy comparison result and a voice recognition result.

In this step, transmitting feedback information to the terminal devices includes: transmitting response information of the voice information to the terminal device with the highest energy value. According to the energy comparison result of the wake-up word, the device terminal with the highest energy value is selected and responds to the voice information, and the other terminal devices will not be transmitted feedback information and thus will not respond to the voice information.

It should be noted that the comparison of the energy values of the wake-up word in embodiment 1 is performed in real time, and is only performed on the information transmitted by different devices regarding the same wake-up behavior. Comparison will not be performed on different wake-up behaviors (such as two pieces of different voice information).

The application and principle of the method for selectively interacting with multi-devices of embodiment 1 are described below with reference to an example.

Figure 2:
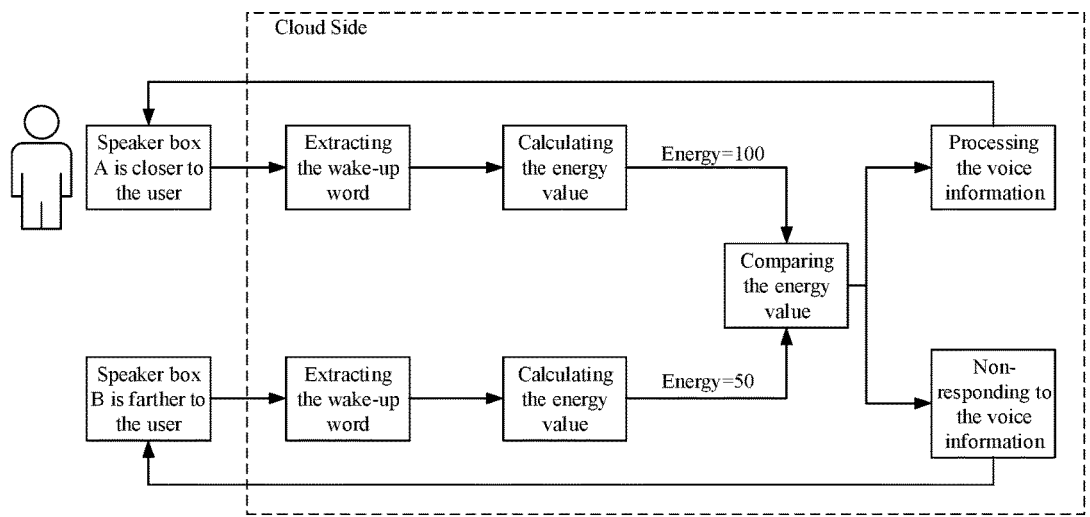
FIG. 2 is a schematic view of an example according to embodiment 1.

As shown in FIG. 2, it is assumed that there are now two device terminals, a speaker box A and a speaker box B, respectively, and the user is closer to the speaker box A. Then, the user gives out voice information "Xiaodu, Xiaodu, turn up the volume". At this time, both the speaker box A and the speaker box B upload voice information to the cloud side.

Then, after receiving the voice information, a wake-up word is extracted from the voice information at the cloud side respectively, and then energy calculation of the wake-up word is performed respectively. It is assumed that the energy calculation result of the speaker box A is 100, and that of the speaker box B is 50 here.

After calculating the energy values of the speaker box A and the speaker box B, it is determined that the energy value of the speaker box A is higher, and therefore the voice information is responded by the speaker box A and not responded by the speaker box B.

Embodiment 2

Embodiment 2 differs from embodiment 1 in that: embodiment 2 further includes calibrating recording performances of a plurality of terminal devices. Different terminal devices have different recording performances, and thus the recording performances need to be calibrated. The specific solution is as follows.

Figure 3:
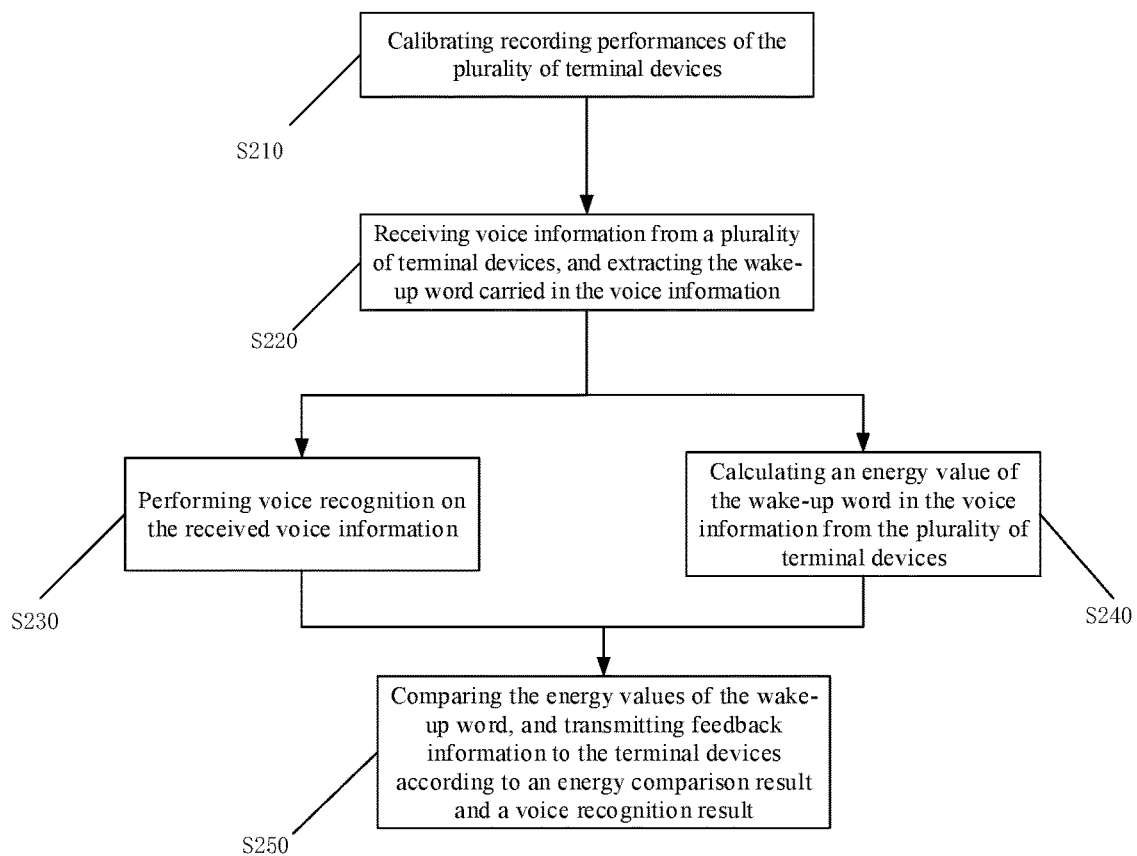
FIG. 3 is a flowchart of the method for selectively interacting with multi-devices according to embodiment 2.

FIG. 3 illustrates a flowchart of a method for selectively interacting with multi-devices of embodiment 2. Embodiment 2 of the present application provides a method for selectively interacting with multi-devices, which includes the following steps.

S210, calibrating recording performances of the plurality of terminal devices. The step S210 specifically includes:

transmitting a play request for a standard speech to the plurality of terminal devices, wherein the standard speech is played and recorded by the plurality of terminal devices; and receiving recordings uploaded by the plurality of terminal devices, acquiring the recording performances of the respective terminal devices based on the received recordings, and setting recording performance coefficients for the respective terminal devices.

Due to different properties and parameters of different terminal devices, their recording performances are different, and the terminal devices need to be calibrated. In this step, a standard speech is transmitted to each terminal device, and then played and recorded by each terminal device. Then the recordings are returned to the cloud side for comparison. For example, it is assumed that the energy value of the standard speech is 10, and the energy value of the returned recording of the terminal device A is 9 while the energy value of the returned recording of the terminal device B is 11, different coefficients will be set for the terminal device A and the terminal device B for calibrating. By the standard of 10, the coefficient of the terminal device A is set to be 10/9, while the coefficient of the terminal device B is set to be 10/11.

S220, receiving voice information from a plurality of terminal devices, and extracting the wake-up word carried in the voice information, wherein the voice information from the plurality of terminal devices comprises an identical wake-up word.

S230, performing voice recognition on the received voice information.

S240, calculating an energy value of the wake-up word in the voice information from the plurality of terminal devices. The calculating specifically includes: calculating an energy value according to a sound volume of the wake-up word.

S250, comparing the energy values of the wake-up word, and transmitting feedback information to the terminal devices according to an energy comparison result and a voice recognition result.

Steps S220 to S250 in embodiment 2 are identical with those in embodiment 1, and are therefore not described again.

Embodiment 3

Comparing with embodiment 2, in embodiment 3, a setting step of adding or deleting a terminal device by a user is further included. The specific solution is as follows.

Figure 4:
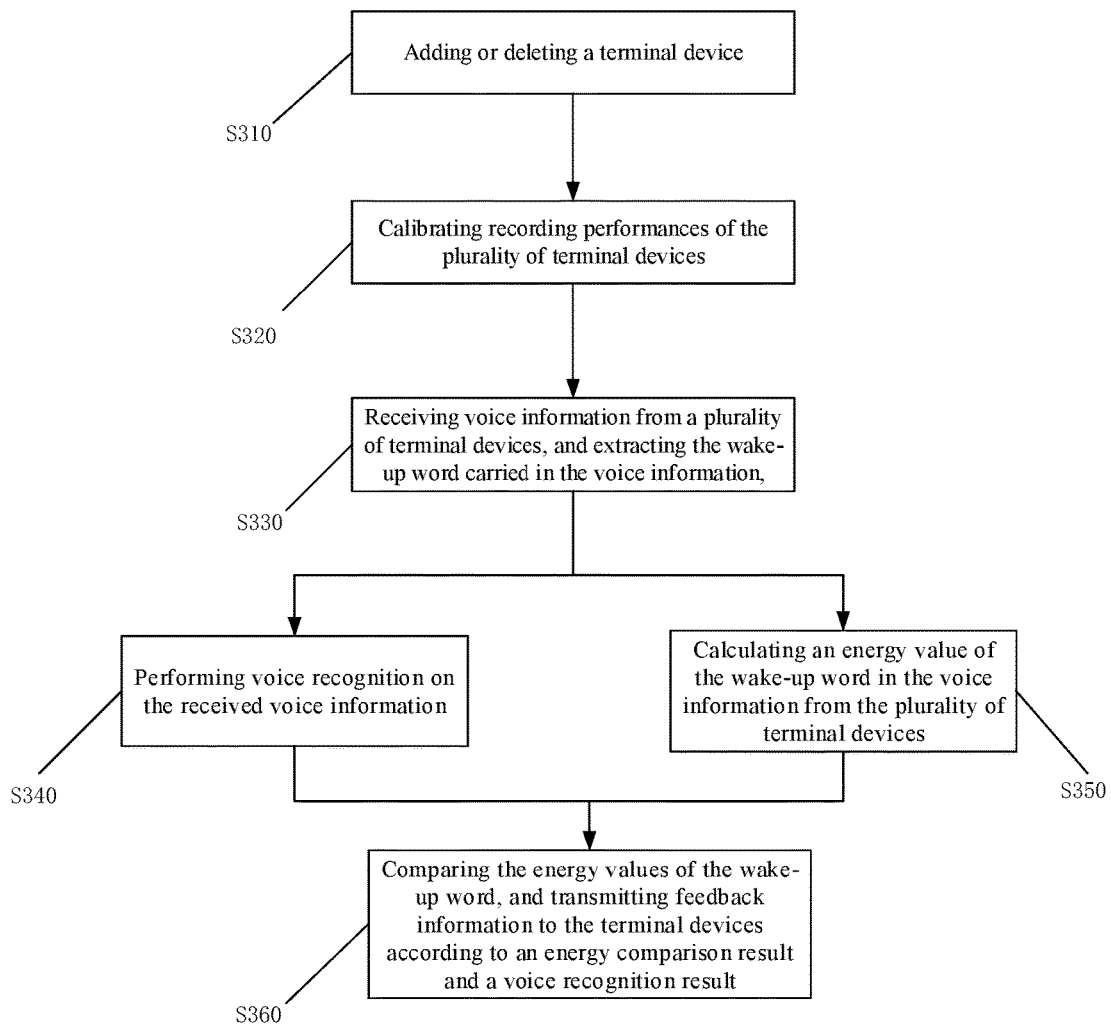
FIG. 4 is a flowchart of steps of the method for selectively interacting with multi-devices according to embodiment 3.

FIG. 4 is a flowchart of steps of the method for selectively interacting with multi-devices of embodiment 3. Embodiment 3 provides a method for selectively interacting with multi-devices, which specifically includes the following steps.

S310, adding or deleting a terminal device.

In this step, the user adds or deletes a device according to a specific scenario and usage requirements. For example, because the terminal devices close to each other are easier to receive identical voice information at the same time, the user may only need to add several terminal devices close to each other, such as a television, a speaker box and so on.

S320, calibrating recording performances of the plurality of terminal devices. The calibrating specifically includes: transmitting a play request for a standard speech to the plurality of terminal devices, wherein the standard speech is played and recorded by the plurality of terminal devices; and receiving recordings uploaded by the plurality of terminal devices, acquiring the recording performances of the respective terminal devices based on the received recordings, and setting recording performance coefficients for the respective terminal devices.

S330, receiving voice information from a plurality of terminal devices, and extracting the wake-up word carried in the voice information, wherein the voice information from the plurality of terminal devices comprises an identical wake-up word.

S340, performing voice recognition on the received voice information.

S350, calculating an energy value of the wake-up word in the voice information from the plurality of terminal devices. The calculating specifically includes: calculating the energy value according to a sound volume of the wake-up word.

S360, comparing the energy values of the wake-up word, and transmitting feedback information to the terminal devices according to an energy comparison result and a voice recognition result.

Steps S320 to S360 in embodiment 3 are identical with those in embodiment 2, and are therefore not described again.

Embodiment 4

Figure 5:
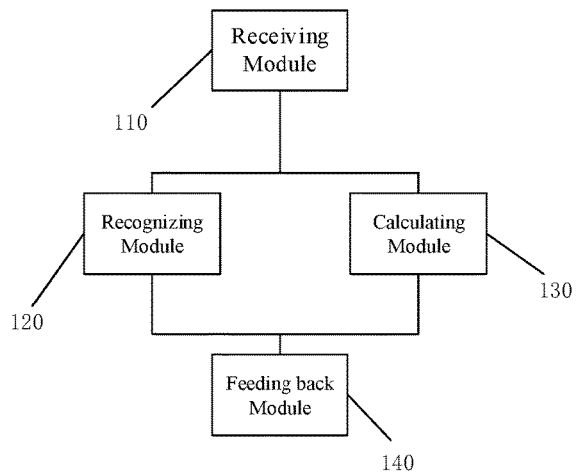
FIG. 5 is a connection block diagram of a device for selectively interacting with multi-devices according to embodiment 4.

Embodiment 4 provides a device for selectively interacting with multi-devices in correspondence to embodiment 1. FIG. 5 is a connection block diagram of the device for selectively interacting with multi-devices of embodiment 4. Embodiment 4 of the present application provides a device for selectively interacting with multi-devices, which includes a receiving module 110, a recognizing module 120, a calculating module 130 and a feeding back module 140.

The receiving module 110 is configured to receive voice information from a plurality of terminal devices and extract the wake-up word carried in the voice information, wherein the voice information from the plurality of terminal devices comprises an identical wake-up word.

The recognizing module 120 is configured to perform voice recognition on the received voice information.

The calculating module 130 is configured to calculate an energy value of the wake-up word in the voice information from the plurality of terminal devices. The calculating module 130 is further configured to calculate the energy value according to a sound volume of the wake-up word.

The feeding back module 140 is configured to compare the energy values of the wake-up word, and transmit feedback information to the terminal devices according to an energy comparison result and a voice recognition result.

The feeding back module is further configured to compare the energy values of the wake-up word, transmit response information of the voice information to the terminal device with the highest energy value.

Figure 6:
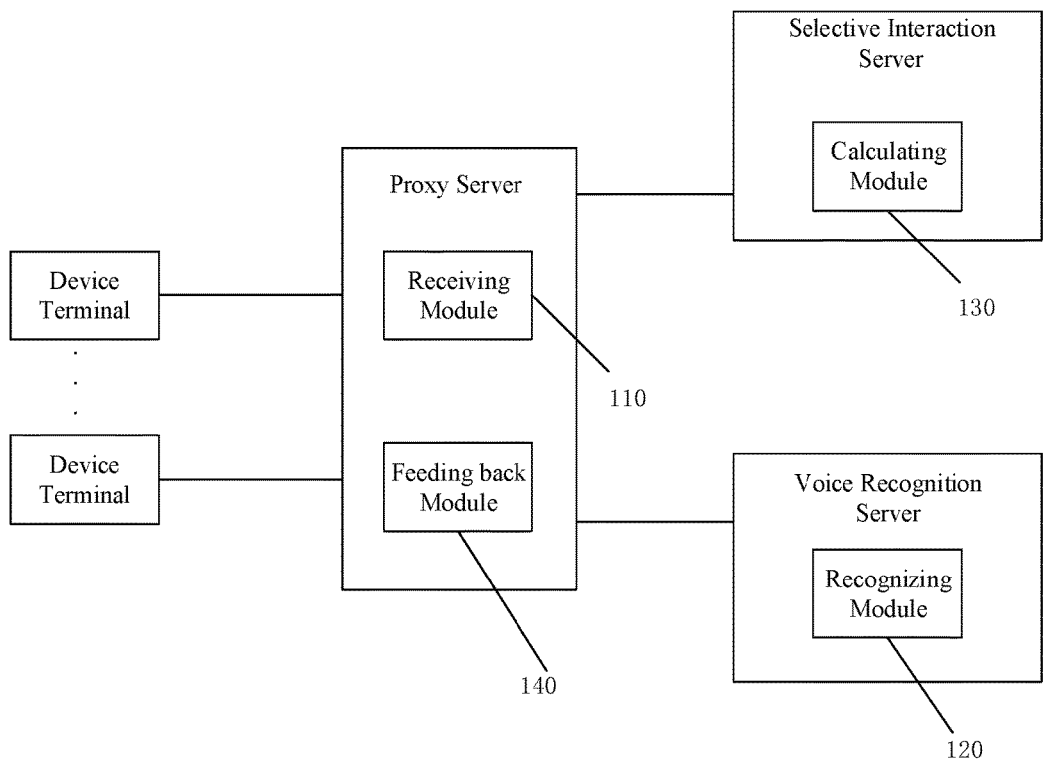
FIG. 6 is an architecture diagram of the device for selectively interacting with multi-devices according to embodiment 4.

In a specific application, the above operations can be done by using a proxy server, a selective interaction server and a voice recognition server. FIG. 6 illustrates an architecture diagram of the device for selectively interacting with multi-devices of embodiment 4. Specifically, the proxy server includes the receiving module 110 and the feeding back module 140. Voice information from the terminal devices may be received and fed back by the proxy server. The collaborative interaction server includes the calculating module 130 and is configured to wake-up word information extracted by the proxy server, perform energy calculation on the wake-up words and then feed back to the proxy server. The voice recognition server includes the recognizing module 120 and is configured to receive the voice information from the proxy server, perform voice recognition and conversion on the voice information and return the recognized voice information to the proxy server.

The principle of embodiment 4 is identical with that of embodiment 1, and therefore not described herein again.

Embodiment 5

Embodiment 5 provides a device for selectively interacting with multi-devices in correspondence to embodiment 2, which is specifically described as follows.

Figure 7:
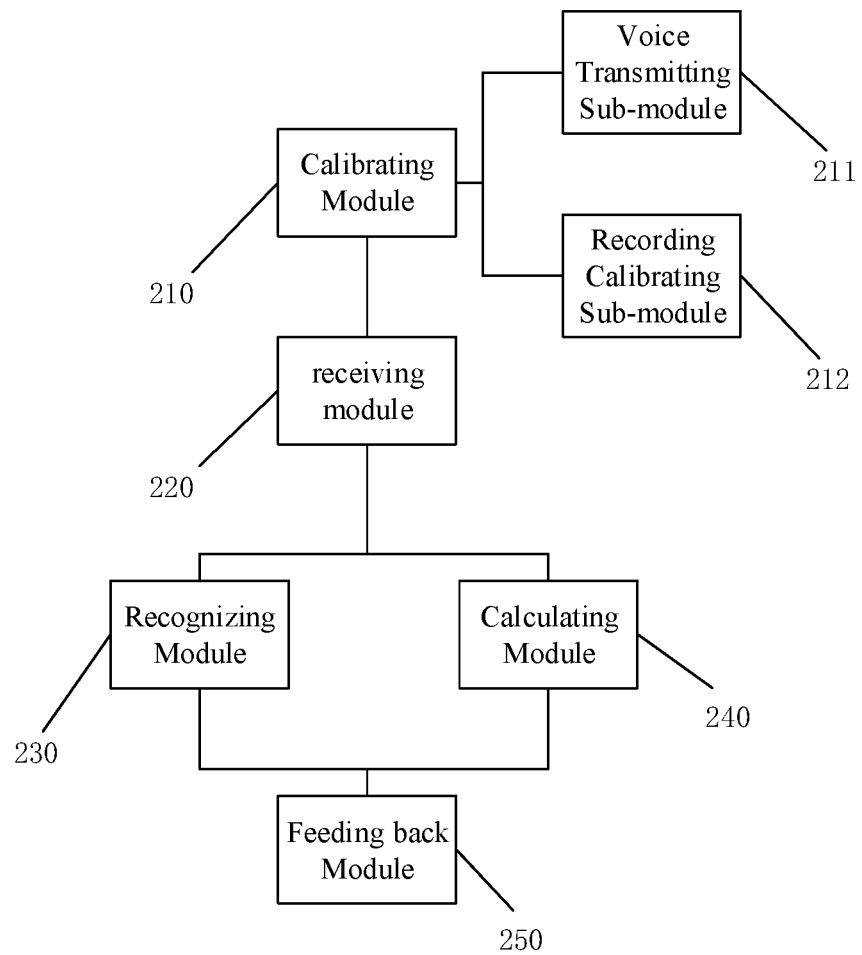
FIG. 7 is a connection block diagram of the device for selectively interacting with multi-devices according to embodiment 5.

FIG. 7 illustrates a connection block diagram of the device for selectively interacting with multi-devices of embodiment 5.

Embodiment 4 of the present application provides a device for selectively interacting with multi-devices, which includes a calibrating module 210, a receiving module 220, a recognizing module 230, a calculating module 240 and a feeding back module 250.

The calibrating module 210 is configured to calibrate recording performances of the plurality of terminal devices, and includes: a voice transmitting sub-module 211 configured to transmit a play request for a standard speech to the plurality of terminal devices, wherein the standard speech is played and recorded by the plurality of terminal devices; and a recording calibrating sub-module 212 configured to receive recordings uploaded by the plurality of terminal devices, acquire the recording performances of the respective terminal devices, and set recording performance coefficients for the respective terminal devices.

The receiving module 220 is configured to receive voice information from a plurality of terminal devices and extract the wake-up word carried in the voice information, wherein the voice information from the plurality of terminal devices comprises an identical wake-up word.

The recognizing module 230 is configured to perform voice recognition on the received voice information.

The calculating module 240 is configured to calculate an energy value of the wake-up word in the voice information from the plurality of terminal devices. The calculating module 240 is further configured to calculate the energy value according to a sound volume of the wake-up word.

The feeding back module 250 is configured to compare the energy values of the wake-up word, and transmit feedback information to the terminal devices according to an energy comparison result and a voice recognition result.

The feeding back module is further configured to compare the energy values of the wake-up word, transmit response information of the voice information to the terminal device with the highest energy value.

The application mode and principle of embodiment 5 is identical with those of embodiment 2, and therefore not described herein again.

Embodiment 6

Figure 8:
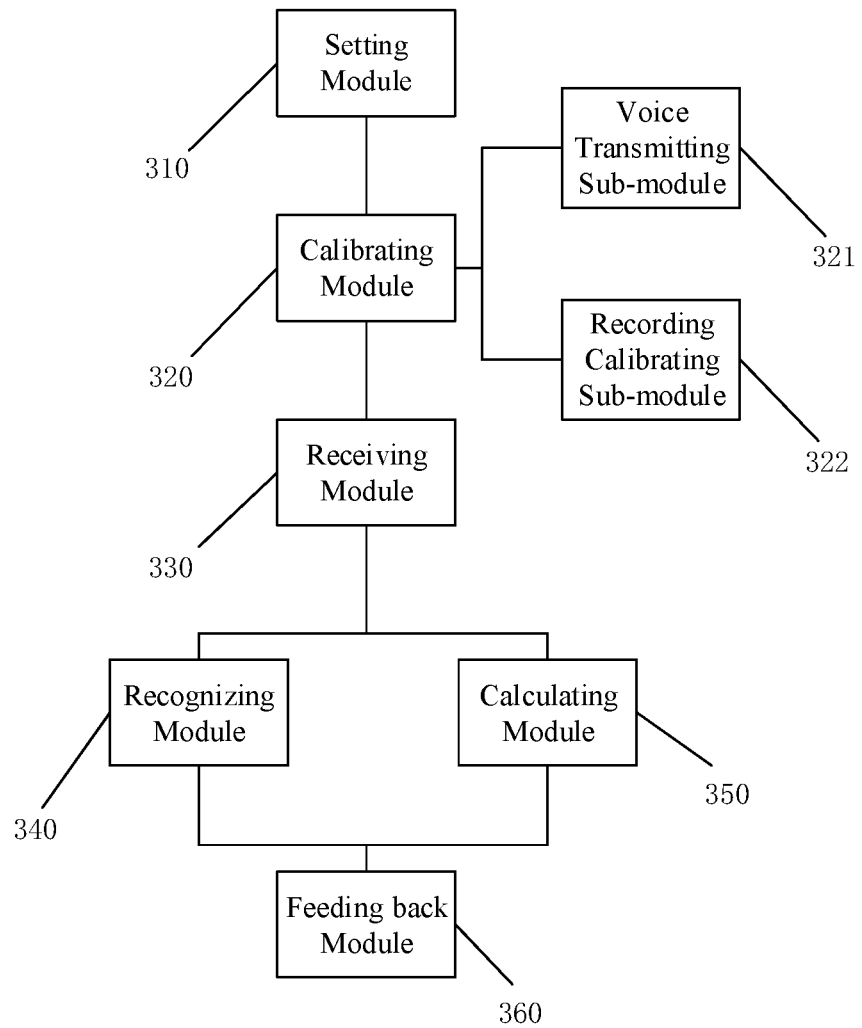
FIG. 8 is a connection block diagram of the device for selectively interacting with multi-devices according to embodiment 6.

A device for selectively interacting with multi-devices in correspondence to embodiment 3 is provided according to an embodiment 6. FIG. 8 is a connection block diagram of the device for selectively interacting with multi-devices of embodiment 6.

Embodiment 4 of the present application provides a device for selectively interacting with multi-devices, which includes a setting module 310, a calibrating module 320, a receiving module 330, a recognizing module 340, a calculating module 350 and a feeding back module 360.

The setting module 310 is configured to add or delete a terminal device.

The calibrating module 320 is configured to calibrate recording performances of the plurality of terminal devices, and includes: a voice transmitting sub-module 321 configured to transmit a play request for a standard speech to the plurality of terminal devices, wherein the standard speech is played and recorded by the plurality of terminal devices; and a recording calibrating sub-module 322 configured to receive recordings uploaded by the plurality of terminal devices, acquire the recording performances of the respective terminal devices, and set recording performance coefficients for the respective terminal devices.

The receiving module 330 is configured to receive voice information from a plurality of terminal devices and extract the wake-up word carried in the voice information, wherein the voice information from the plurality of terminal devices comprises an identical wake-up word.

The recognizing module 340 is configured to perform voice recognition on the received voice information.

The calculating module 350 is configured to calculate an energy value of the wake-up word in the voice information from the plurality of terminal devices. The calculating module 130 is further configured to calculate the energy value according to a sound volume of the wake-up word.

The feeding back module 360 is configured to compare the energy values of the wake-up word, and transmit feedback information to the terminal devices according to an energy comparison result and a voice recognition result.

The feeding back module is further configured to compare the energy values of the wake-up word, transmit response information of the voice information to the terminal device with the highest energy value.

The principle of embodiment 6 is identical with that of embodiment 3, and therefore not described herein again.

Embodiment 7

Figure 9:
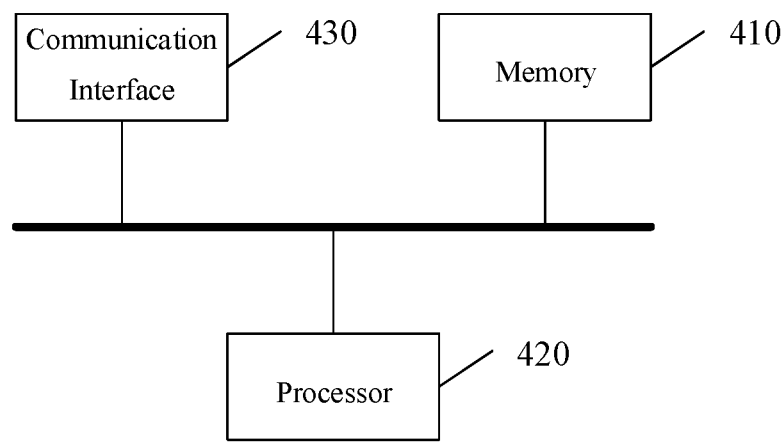
FIG. 9 is a connection block diagram of an apparatus for selectively interacting with multi-devices according to embodiment 7 of the present application.

Embodiment 7 of the present application provides a device for selectively interacting with multi-devices. As shown in FIG. 9, the device includes a processor 420, and a memory 410 in which computer programs that are capable of operating on the processor 420 are stored. The processor 420 implements the method for selectively interacting with multi-devices in the above-described embodiments while executing the computer programs. The number of the memory 410 and the processor 420 may be one or more.

The device further includes a communication interface 430 which is configured to be communicated with an external device to perform data interaction and transmission.

The memory 410 may include a high-speed RAM memory or a non-volatile memory, such as at least one disk memory.

If the memory 410, the processor 420 and the communication interface 430 are implemented independently, the memory 410, the processor 420 and the communication interface 430 may be connected to each other through a bus to complete the mutual communication. The bus may be an ISA (Industry Standard Architecture) bus, a PCI (Peripheral Component) bus, an EISA (Extended Industry Standard Component) bus, or the like. The bus may be divided into an address bus, a data bus, a control bus, and the like. For ease of presentation, only one bold line is shown in FIG. 9, but this does not mean that there is only one bus or one type of bus.

Optionally, in a specific implementation, if the memory 410, the processor 420 and the communication interface 430 are integrated on one chip, the memory 410, the processor 420 and the communication interface 430 may accomplish mutual communication through an internal interface.

In the description of the present specification, the reference terms such as "an embodiment", "some embodiments", "an example", "a specific example" and "some examples" mean that the particular features, structures, materials or characteristics described in combination of the embodiments or examples are included in at least one embodiment or example of the present application. Furthermore, the described particular features, structures, materials or characteristics may be combined in a proper manner in any one or more embodiments or examples. In addition, in the absence of contradiction, one skilled in the art can integrate and combine different embodiments or examples described in this specification and the features of different embodiments or examples.

In addition, the terms "first" and "second" are used for a descriptive purpose only and shall not be construed as indicating or implying relative importance or implicitly indicating the number of the indicated technical features. Thus, features defining "first" and "second" may explicitly or implicitly in dude at least one of the features. In the description of the present application, "a plurality of" means two or more, unless expressly limited otherwise.

Any process or method descriptions described in flow-charts or otherwise herein may be understood as representing modules, segments or portions of codes that include one or more executable instructions for implementing the steps of a particular logical function or process. In addition, the scope of the preferred embodiments of the present application includes further implementations in which functions may be performed in a substantially simultaneous form or an inverse sequence according to the involved functions, rather than the sequence shown or discussed, which should be understood by those skilled in the art.

Logic and/or steps, which are represented in the flow-charts or otherwise described herein, for example, may be considered as a sequencing table of executable instructions for implementing logic functions, which may be specifically embodied in any computer-readable medium, for use by or in connection with an instruction execution system, apparatus or device (such as a computer-based system, a system including a processor, or other system that may acquire instructions from the instruction execution system, apparatus or device and execute the instructions). For the purposes of this specification, the "computer-readable medium" may be any apparatus that can contain, store, communicate, propagate, or transport the programs for use by or in connection with the instruction execution system, apparatus or device.

The computer-readable medium according to the embodiments of the present application may be a computer-readable signal medium or a computer-readable storage medium, or any combination thereof. More specific examples of the computer-readable storage medium at least (non-exhaustive list) include the followings: an electrical connection (electronic device) having one or more wires, a portable computer enclosure (magnetic device), a random access memory (RAM), a read only memory (ROM), an erasable programmable read only memory (EPROM or flash memory), an optical fiber device, and a portable read only memory (CDROM). In addition, the computer-readable storage medium may even be paper or other suitable medium upon which the programs can be printed as it may, for example, by optically scanning the paper or other medium followed by editing, interpretation or, if necessary, processing in a suitable manner electronically obtain the programs which are then stored in a computer memory.

In an embodiment of the present application, the computer-readable signal medium may include a data signal propagating in a baseband or as a part of a carrier and carry computer-readable program codes. Such propagated data signals may take many forms, including but not limited to electromagnetic signals, optical signals, or any suitable combination thereof. The computer-readable signal medium may also be any computer-readable medium other than a computer-readable storage medium that can transmit, propagate or transport a program for use by or in connection with an instruction execution system, an input method or a device. Program codes embodied on the computer-readable medium may be transmitted using any appropriate medium, including but not limited to wireless, electric wires, optical fiber cables, radio frequency (RF), etc., or any suitable combination thereof.

It should be understood that various portions of the present application may be implemented by hardware, software, firmware, or a combination thereof. In the above embodiments, a plurality of steps or methods may be implemented with software or firmware that are stored in the memory and executed by a suitable instruction execution system. For example, if implemented with hardware, as in another embodiment, they may be implemented using any one or a combination of the following techniques well known in the art: a discrete logic circuit having a logic gate circuit having logic gates for implementing logic functions of data signals, an application-specific integrated circuit with a suitable combinational logic gate circuit, a programmable gate array (PGA), a field programmable gate array (FPGA), and the like.

One ordinary skilled in the art may understand that all or part of the steps carried in the methods in the above embodiments may be implemented by programs instructing relevant hardware. The programs may be stored in a computer-readable storage medium, when executed, one or a combination of the steps of the method embodiment is included.

In addition, the functional units in the embodiments of the present application may be integrated in a processing module, or may exist as physically independent units. Two or more units may also be integrated into one module. The integrated module can be realized in the form of hardware or in the form of a software function module. When the integrated module is realized in a form of the software function module and is sold or used as an independent product, it may be stored in a computer-readable storage medium. The storage medium may be a read-only memory, a magnetic disk, an optical disk, or the like.

From the above, according to the embodiments of the present application, by calculating the energy of the wake-up word in respective voice information transmitted by respective device is calculated, the distances between respective device and a user can be distinguished, and a unique response can be ensured by determining that the device closest to the user responds to the user's request, thus ensuring the user experience.

The content described above are specific embodiments of the present application, but the protection scope of the present application is not limited thereto. Any person skilled in the art may easily anticipate various alternations or replacements of these embodiments within the technical scope disclosed in the present application, and all these alternations or replacements should be covered by the protection scope of the present application. Therefore, the protection scope of the present application should be defined by the claims.

What is claimed is:

1. A method for selectively interacting with multi-devices, comprising:
    receiving voice information from a plurality of terminal devices, wherein the voice information from the plurality of terminal devices comprises an identical wake-up word;
    performing voice recognition on the received voice information;
    calculating an energy value of the wake-up word in the voice information from the plurality of terminal devices; and
    comparing the energy values of the wake-up word, and transmitting feedback information to the terminal devices according to an energy comparison result and a voice recognition result,
    wherein before the receiving voice information from a plurality of terminal devices, the method further comprises: calibrating recording performances of the plurality of terminal devices, wherein the calibrating comprises:
    transmitting a play request for a standard speech to the plurality of terminal devices, wherein the standard speech is played and recorded by the plurality of terminal devices; and
    receiving recordings uploaded by the plurality of terminal devices, acquiring the recording performances of the respective terminal devices based on the received recordings, and setting recording performance coefficients for the respective terminal devices.

2. The method for selectively interacting with multi-devices according to claim 1, wherein the receiving voice information from a plurality of terminal devices further comprises: extracting the wake-up word carried in the voice information.

3. The method for selectively interacting with multi-devices according to claim 1, wherein the calculating an energy value of the wake-up word in the voice information comprises: calculating the energy value according to a sound volume of the wake-up word.

4. The method for selectively interacting with multi-devices according to claim 1, wherein the transmitting feedback information to the terminal devices according to an energy comparison result and a voice recognition result comprises: transmitting response information of the voice information to the terminal device with the highest energy value.

5. The method for selectively interacting with multi-devices according to claim 1, before the receiving voice information from a plurality of terminal devices, further comprising: adding or deleting a terminal device.

6. A device for selectively interacting with multi-devices, comprising:
    one or more processors; and
    a storage device configured for storing one or more programs, wherein
    the one or more programs are executed by the one or more processors to enable the one or more processors to:

receive voice information from a plurality of terminal devices, wherein the voice information from the plurality of terminal devices comprises an identical wake-up word;

perform voice recognition on the received voice information;

calculate an energy value of the wake-up word in the voice information from the plurality of terminal devices;

compare the energy values of the wake-up word, and transmit feedback information to the terminal devices according to an energy comparison result and a voice recognition result, and calibrate recording performances of the plurality of terminal devices by:

transmitting a play request for a standard speech to the plurality of terminal devices, wherein the standard speech is played and recorded by the plurality of terminal devices; and receiving recordings uploaded by the plurality of terminal devices, acquire the recording performances of the respective terminal devices, and set recording performance coefficients for the respective terminal devices.

7. The device for selectively interacting with multi-devices according to claim 6, wherein the one or more programs are executed by the one or more processors to enable the one or more processors to extract the wake-up word carried in the voice information.

8. The device for selectively interacting with multi-devices according to claim 6, wherein the one or more programs are executed by the one or more processors to enable the one or more processors to calculate the energy value according to a sound volume of the wake-up word.

9. The device for selectively interacting with multi-devices according to claim 6, wherein the one or more programs are executed by the one or more processors to enable the one or more processors to compare the energy values of the wake-up word, transmit response information of the voice information to the terminal device with the highest energy value.

10. The device for selectively interacting with multi-devices according to claim 6, wherein the one or more programs are executed by the one or more processors to enable the one or more processors to add or delete a terminal device.

11. A non-transitory computer-readable medium in which computer programs are stored, wherein the method for selectively interacting with multi-devices of claim 1 is implemented when the programs are executed by a processor.

* * * * *